United States Patent
Matsumoto

(10) Patent No.: US 9,347,716 B2
(45) Date of Patent: May 24, 2016

(54) INDOOR UNIT OF AIR-CONDITIONING APPARATUS

(71) Applicant: Takashi Matsumoto, Tokyo (JP)

(72) Inventor: Takashi Matsumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 600 days.

(21) Appl. No.: 13/780,007

(22) Filed: Feb. 28, 2013

(65) Prior Publication Data

US 2013/0255909 A1    Oct. 3, 2013

(30) Foreign Application Priority Data

Apr. 2, 2012    (JP) ................................ 2012-083769

(51) Int. Cl.
| | | |
|---|---|---|
| *F28F 27/00* | (2006.01) | |
| *B60H 1/00* | (2006.01) | |
| *F24F 1/00* | (2011.01) | |
| *F24F 11/00* | (2006.01) | |

(Continued)

(52) U.S. Cl.
CPC ............ *F28F 27/00* (2013.01); *B60H 1/00742* (2013.01); *B60H 1/00814* (2013.01); *B60H 1/00985* (2013.01); *F24F 1/0007* (2013.01); *F24F 11/0034* (2013.01); *F24F 11/0078* (2013.01); *F24F 11/0079* (2013.01); *G06F 3/017* (2013.01); *G06K 9/00355* (2013.01); *G06K 9/00832* (2013.01); *F24F 2011/0035* (2013.01); *F24F 2011/0036* (2013.01); *F24F 2011/0068* (2013.01); *Y02B 30/746* (2013.01)

(58) Field of Classification Search
None
See application file for complete search history.

(56) References Cited

U.S. PATENT DOCUMENTS

| 5,180,333 A | | 1/1993 | Shyu | |
|---|---|---|---|---|
| 5,454,043 A | * | 9/1995 | Freeman | A61B 5/1121 345/419 |
| 5,594,469 A | * | 1/1997 | Freeman | G05B 19/106 345/157 |

(Continued)

FOREIGN PATENT DOCUMENTS

| CN | 101131609 A | | 2/2008 | |
|---|---|---|---|---|
| GB | 2423808 B | * | 2/2010 | .............. G06F 3/017 |

(Continued)

OTHER PUBLICATIONS

Office Action dated Jan. 15, 2015 issued in corresponding KR patent application No. 10-2013-0028402 (and English translation).

(Continued)

*Primary Examiner* — Christopher E Everett
(74) *Attorney, Agent, or Firm* — Posz Law Group, PLC

(57) ABSTRACT

An indoor unit of an air-conditioning apparatus is provided, in which an air-conditioning condition changed based on a gesture corresponds to an air-conditioning condition displayed on a display device of a remote controller. With an indoor unit 100, when a user U1 performs a predetermined motion (S1-1), a controller 70 determines the motion of the user U1 (S1-2), recognizes that a gesture instruction condition is instructed (S1-3), controls a heat exchanger 4 and other devices based on the gesture instruction signal (S1-4), and causes the gesture instruction signal to be sent to a remote-controller communication device 85 (S1-5). When a remote controller 80 receives the gesture instruction signal (S1-6), the gesture instruction condition is displayed on a remote-controller display device 82 (S1-7), and buzzer sound (electronic beeper sound) is output from a remote-controller sound output device 83 (S1-8).

7 Claims, 17 Drawing Sheets

(51) Int. Cl.
*G06F 3/01* (2006.01)
*G06K 9/00* (2006.01)

(56) References Cited

U.S. PATENT DOCUMENTS

| | | | | | |
|---|---|---|---|---|---|
| 7,084,774 | B2* | 8/2006 | Martinez | | B60H 1/00742 236/44 C |
| 8,514,251 | B2* | 8/2013 | Hildreth | | G06F 3/017 341/20 |
| 8,537,231 | B2* | 9/2013 | Mekenkamp | | G06F 3/017 348/222.1 |
| 8,555,207 | B2* | 10/2013 | Hildreth | | G06F 3/017 715/856 |
| 8,843,857 | B2* | 9/2014 | Berkes | | G06F 3/011 715/763 |
| 8,847,881 | B2* | 9/2014 | Matsubayashi | | H04N 21/42203 345/156 |
| 8,864,447 | B1* | 10/2014 | Humphrey | | F04D 17/04 415/118 |
| 2002/0126876 | A1* | 9/2002 | Paul | | G06F 3/017 382/104 |
| 2005/0025345 | A1 | 2/2005 | Ohta et al. | | |
| 2006/0182346 | A1* | 8/2006 | Yoda | | G06F 3/017 382/190 |
| 2007/0114292 | A1* | 5/2007 | Breed | | B60H 1/00742 236/49.3 |
| 2008/0052643 | A1 | 2/2008 | Ike et al. | | |
| 2008/0065291 | A1* | 3/2008 | Breed | | B60N 2/002 701/36 |
| 2008/0238665 | A1* | 10/2008 | Peng | | G06F 3/017 340/540 |
| 2009/0102788 | A1* | 4/2009 | Nishida | | G06F 3/014 345/158 |
| 2010/0066676 | A1* | 3/2010 | Kramer | | G06F 3/017 345/158 |
| 2010/0087987 | A1* | 4/2010 | Huang | | B60W 40/08 701/36 |
| 2011/0050589 | A1* | 3/2011 | Yan | | B60K 37/06 345/173 |
| 2011/0155365 | A1* | 6/2011 | Wiese | | F24F 7/013 165/244 |
| 2012/0158189 | A1* | 6/2012 | Cho | | F24F 11/006 700/276 |
| 2012/0158203 | A1* | 6/2012 | Feldstein | | G06F 1/3231 700/295 |
| 2012/0169584 | A1* | 7/2012 | Hwang | | H04L 12/2818 345/156 |
| 2013/0204408 | A1* | 8/2013 | Thiruvengada | | G06F 3/011 700/90 |

FOREIGN PATENT DOCUMENTS

| | | |
|---|---|---|
| JP | 63-143443 A | 6/1988 |
| JP | 01-260255 A | 10/1989 |
| JP | 06-221646 A | 8/1994 |
| JP | 06-337154 A | 12/1994 |
| JP | 2000-074452 A | 3/2000 |
| JP | 2000-171077 A | 6/2000 |
| JP | 2005-050177 A | 2/2005 |
| JP | 2008-185282 A | 8/2008 |
| JP | 2010-107114 A | 5/2010 |
| JP | 2010-163111 A | 7/2010 |
| JP | 2010-181064 A | 8/2010 |
| JP | 2011-080648 A | 4/2011 |
| JP | 2011-137589 A | 7/2011 |
| JP | 2001-216069 A | 8/2011 |
| WO | 2008/066311 A1 | 6/2008 |

OTHER PUBLICATIONS

Office Action mailed Apr. 21, 2015 in the corresponding CN application No. 201310111988.4 (with English translation).
Office Action mailed May 7, 2015 in the corresponding JP application No. 2012-083769 (with English translation).
Office Action mailed Jul. 9, 2014 issued in corresponding KR patent application No. 10-2013-0028402 (and English translation).
Office Action dated Jun. 29, 2015 issued in corresponding KR patent application No. 10-2015-0082314 (and English translation).
European Search Report dated Jul. 29, 2013 in the corresponding European Patent Application No. 13161483.6 (English translation).
Office Action issued Sep. 25, 2015 in the corresponding CN application No. 201310111988.4 (with English translation).
Korean Office Action dated Dec. 28, 2015 in the corresponding Korean application No. 10-2015-0082314. (English translation attached).

* cited by examiner

INCREASE TEMPERATURE

DECREASE TEMPERATURE

INCREASE BLOWING STRENGTH

DECREASE BLOWING STRENGTH

INCREASE BLOWING ANGLE

DECREASE BLOWING ANGLE

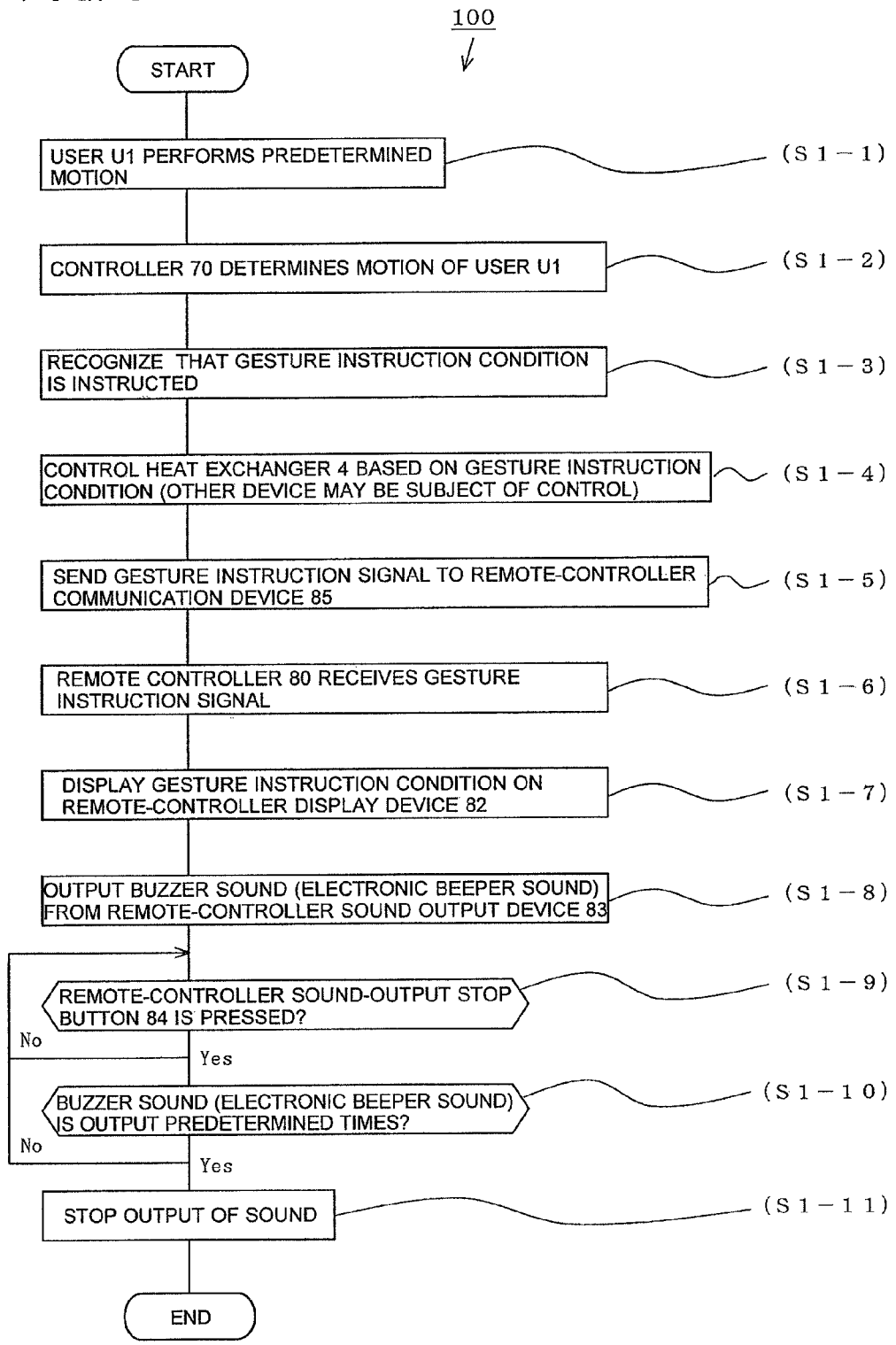

F I G. 1 0
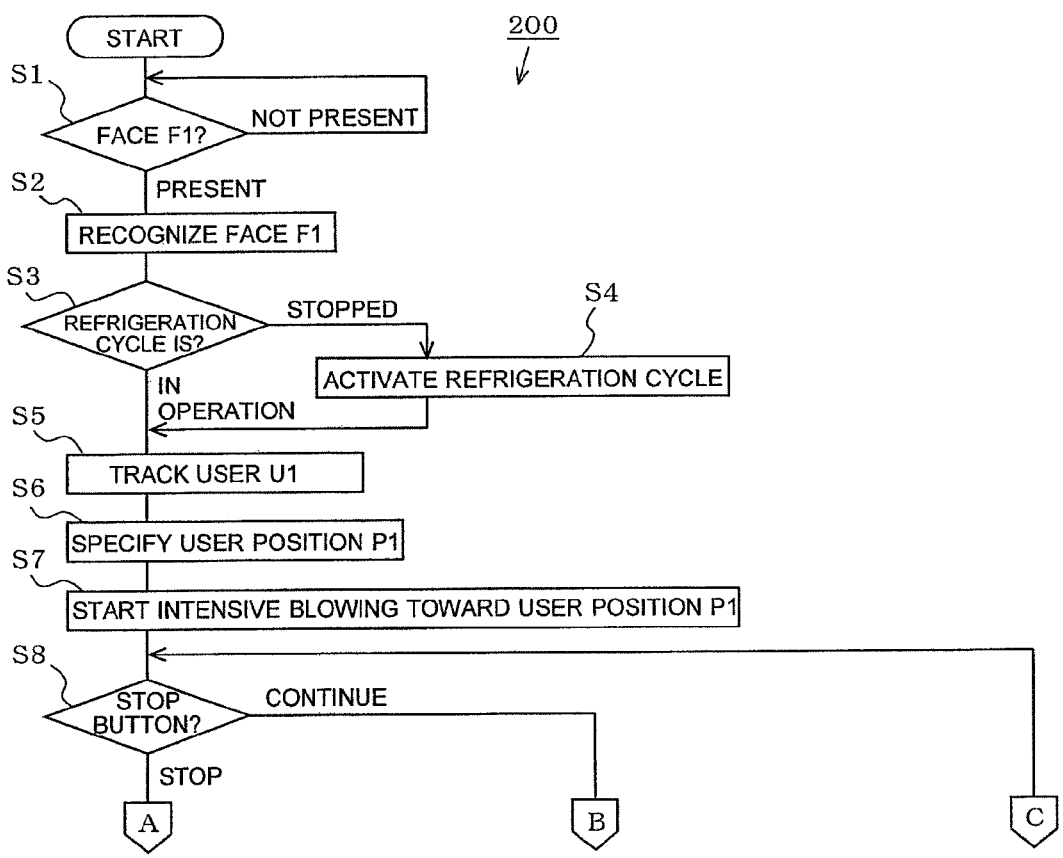

F I G. 1 5
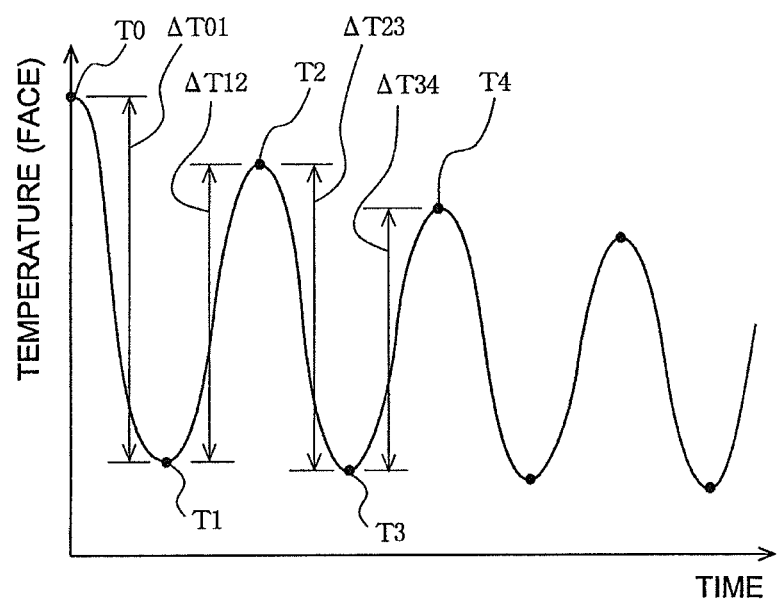

INDOOR UNIT OF AIR-CONDITIONING APPARATUS

TECHNICAL FIELD

The present invention relates to indoor units of air-conditioning apparatuses, and more particularly relates to an indoor unit of an air-conditioning apparatus including an image pickup device that captures an image of the inside of a room.

BACKGROUND ART

Conventionally, for an indoor unit of an air-conditioning apparatus, and in particular, for an indoor unit of an air-conditioning apparatus mounted on a vehicle, an invention is disclosed (for example, see Patent Literature 1), in which, when an operation button is pressed to change an air-conditioning condition (setting temperature or strength of blown air), in order to avoid the line of sight of a driver from moving to the operation button, a hand sign (hereinafter, called "gesture") of the driver is recognized, and the air-conditioning condition is changed based on the recognition.

CITATION LIST

Patent Literature

[Patent Literature 1] Japanese Unexamined Patent Application Publication No. 2001-216069 (pages 5 to 7, FIG. 1)

SUMMARY OF INVENTION

Technical Problem

The indoor unit of the air-conditioning apparatus disclosed in Patent Literature 1 does not need the operation with the operation button and convenience is increased. However, if the indoor unit includes a remote control operation device (hereinafter, called "remote controller"), the air-conditioning condition changed based on the gesture is not transmitted to the remote controller. Hence, a previous air-conditioning condition before the condition is changed is continuously displayed on a display device of the remote controller.

Owing to this, since the air-conditioning condition displayed on the display device of the remote controller is different from the air-conditioning condition of the actual operation (hereinafter, called "asynchronization of default reference"), a user may feel uncomfortable (problem 1).

Also, if the air-conditioning condition is changed by the gesture and then the air-conditioning condition is to be changed by the remote controller, due to the asynchronization of default (reference), a changed value (or a change amount) is set based on the air-conditioning condition displayed on the display device of the remote controller, the condition which is different from the air-conditioning condition of the actual operation. A desirable air-conditioning condition may not be attained (problem 2).

Further, if the asynchronization of default (reference) is to be addressed, when the air-conditioning condition is changed by the gesture (or after the air-conditioning condition is changed), troublesome work is required for operating the remote controller and setting the air-conditioning condition again, and the convenience is no longer provided (problem 3).

The present invention addresses the problems 1 to 3, and provides an indoor unit of an air-conditioning apparatus that allows an air-conditioning condition changed by a gesture to correspond to an air-conditioning condition displayed on a display device of a remote controller, that is, allows synchronization of default (reference) to be attained.

Solution to Problem

An indoor unit of an air-conditioning apparatus according to the present invention includes a main body installed on a wall surface in a room and including a main-body communication device, and a wireless remote controller including a wireless-remote-controller communication device that makes communication with the main-body communication device by using a signal. The main body has an air inlet and an air outlet, the main body including a fan that sucks indoor air from the air inlet and forms an air path to the air outlet, a heat exchanger that is arranged in the air path and executes part of a refrigeration cycle, an image pickup device that captures an image of the inside of the room, and a controller that causes the main-body communication device and the wireless-remote-controller communication device to make communication by using a signal. The controller associates a motion of a person whose image is captured by the image pickup device with one of previously registered air-conditioning conditions, based on a remote-controller instruction condition which is an air-conditioning condition corresponding to a signal sent from the wireless-remote-controller communication device or based on the motion, the controller controls at least one of the fan and the refrigeration cycle based on a gesture instruction condition which is the associated air-conditioning condition, and the controller causes the main-body communication device to send a signal corresponding to the gesture instruction condition. The wireless remote controller includes a wireless-remote-controller display device, and when the wireless-remote-controller communication device receives the signal corresponding to the gesture instruction condition, the wireless-remote-controller display device displays the gesture instruction condition.

Advantageous Effects of Invention

The indoor unit of the air-conditioning apparatus according to the present invention is operated under the gesture instruction condition based on the motion of the person, and the gesture instruction condition is displayed on the wireless-remote-controller display device. Thus, the synchronization of default (reference) is attained. Hence, the uncomfortable feeling of the user because of the asynchronization of default (reference) is addressed. If the air-conditioning condition is set based on the air-conditioning condition displayed on the remote-controller display device, a desirable air-conditioning condition can be provided. Further, when the air-conditioning condition is changed by the gesture, since the air-conditioning condition which is the same as the gesture instruction condition does not have to be set in the remote controller again, the convenience is increased.

BRIEF DESCRIPTION OF DRAWINGS

FIG. 8 is a flowchart showing a display flow of a gesture setting condition of the indoor unit shown in FIG. 1.

FIG. 10 is a flowchart showing a flow of control of the indoor unit shown in FIG. 9.

FIG. 15 is a temperature change chart schematically showing a change in temperature of swing blowing for explaining an indoor unit of an air-conditioning apparatus according to Embodiment 4 of the present invention.

DESCRIPTION OF EMBODIMENTS

Embodiment 1

Figure 1:
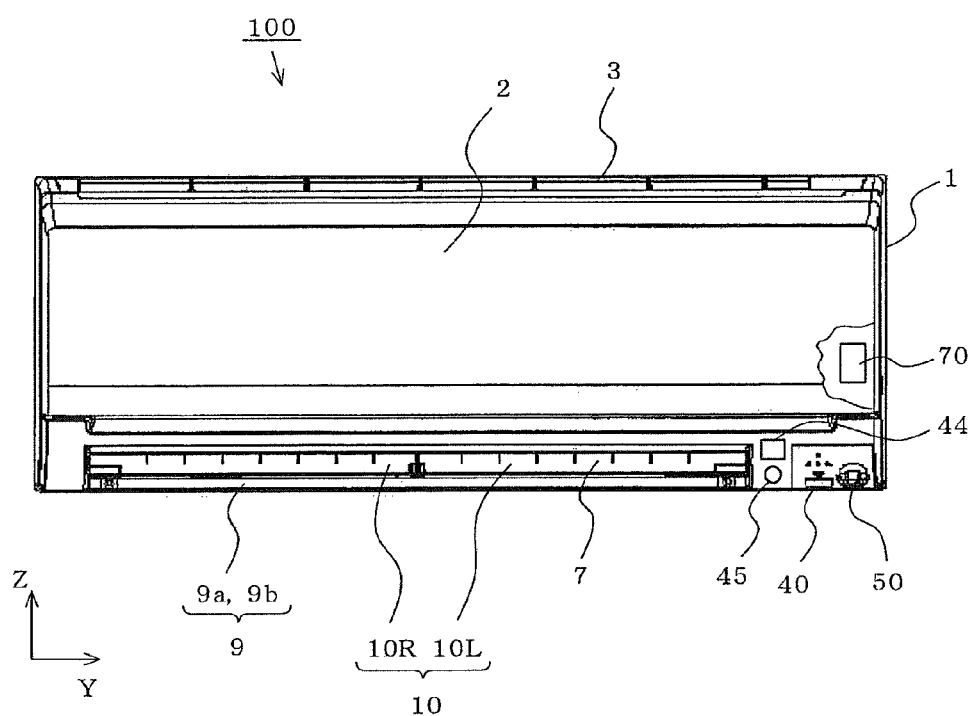
FIG. 1 is a front view for explaining an indoor unit of an air-conditioning apparatus according to Embodiment 1 of the present invention.
Figure 2:
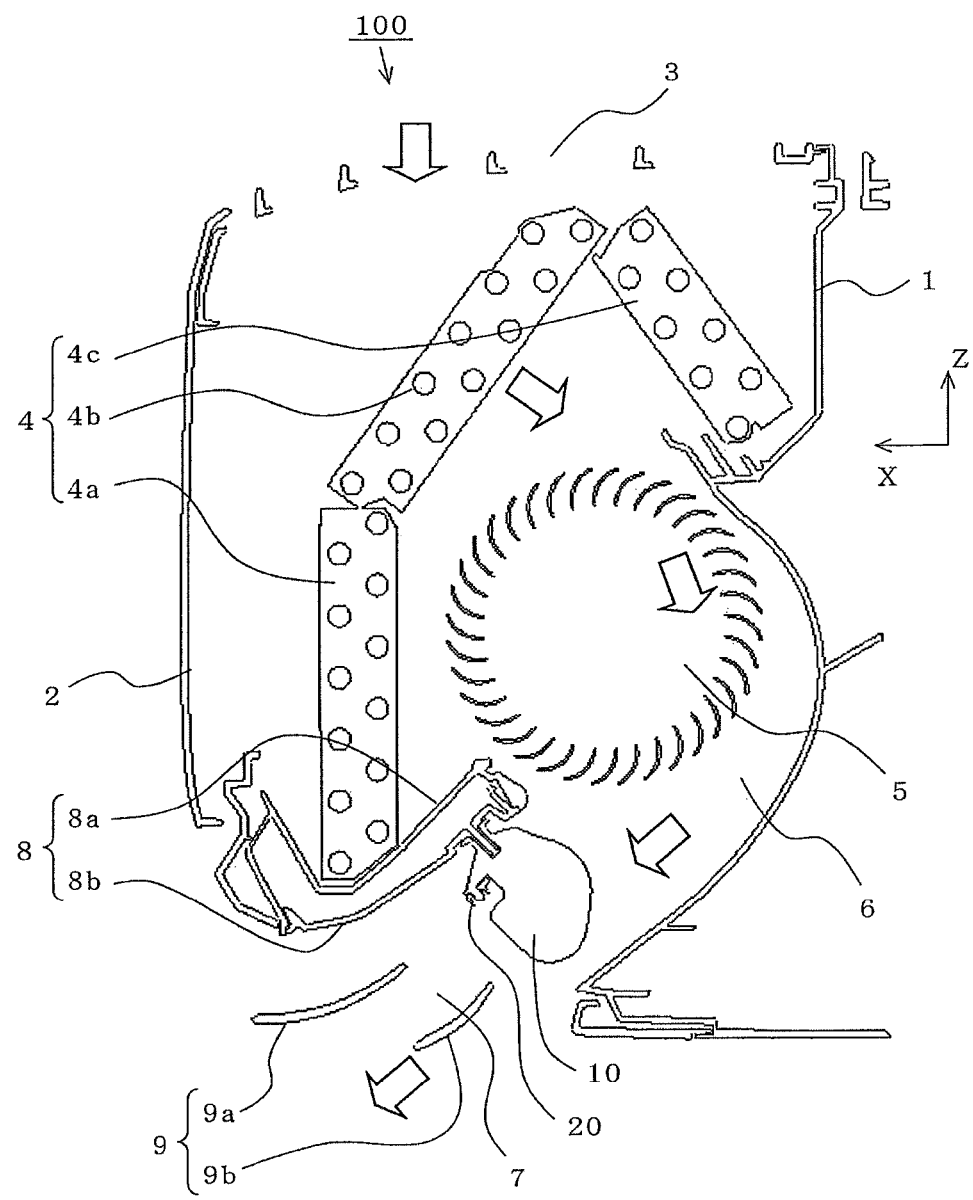
FIG. 2 is a cross section in a side view for explaining the indoor unit shown in FIG. 1.
Figure 3:
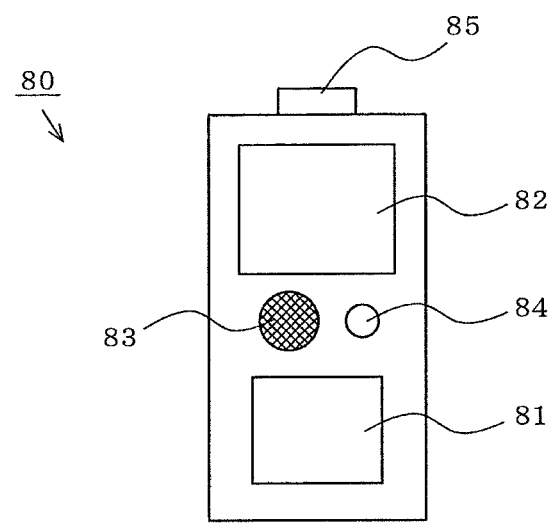
FIG. 3 is a front view of a wireless remote controller of the indoor unit shown in FIG. 1.
Figure 4:
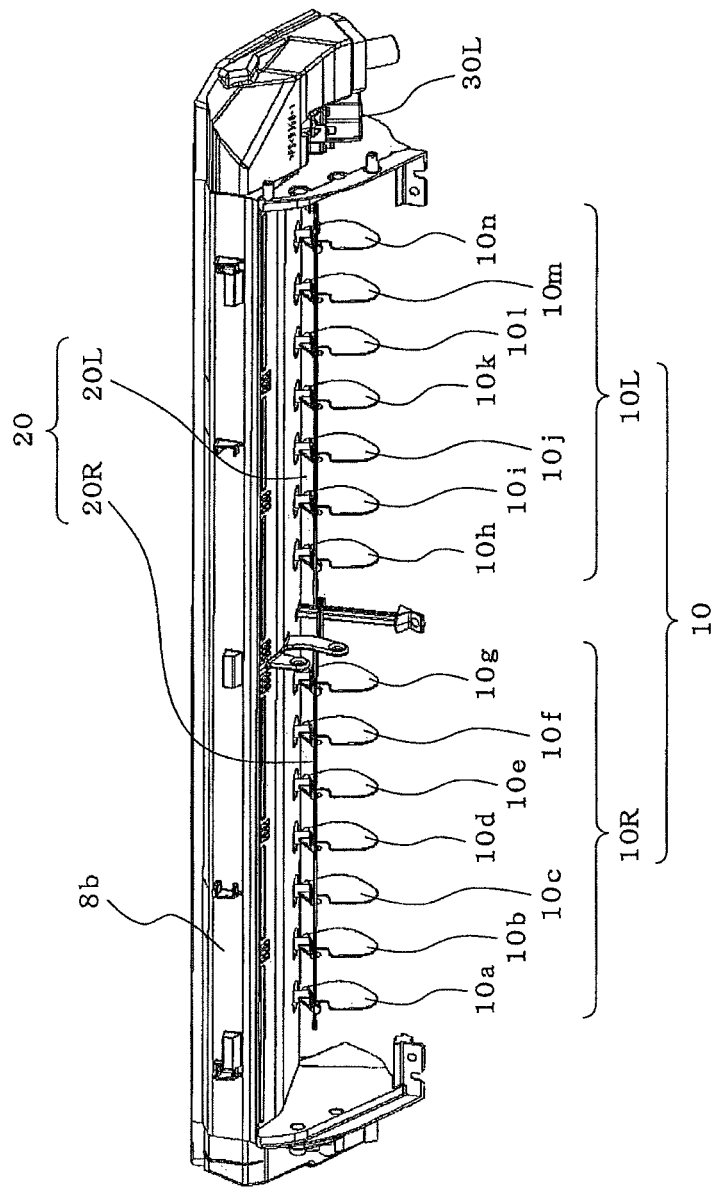
FIG. 4 is a perspective view showing part (around an air outlet) extracted from the indoor unit shown in FIG. 1.
Figure 5A:
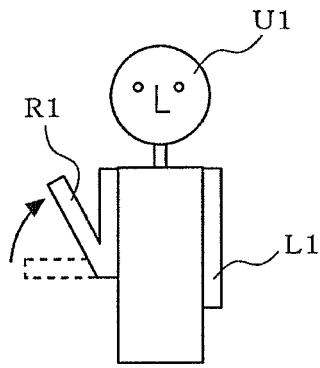
FIG. 5A provides a schematic view showing the relationship between a motion of a person and a setting condition of the indoor unit shown in FIG. 1.
Figure 5B:
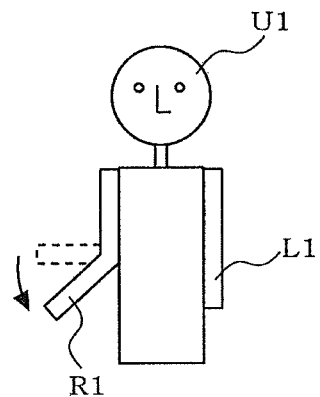
FIG. 5B provides a schematic view showing the relationship between a motion of a person and a setting condition of the indoor unit shown in FIG. 1.
Figure 5C:
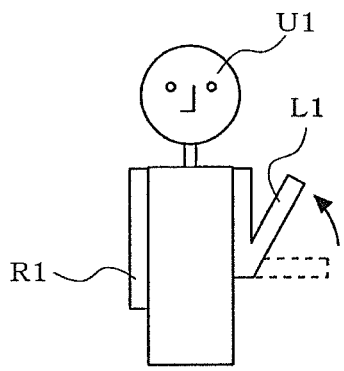
FIG. 5C provides a schematic view showing the relationship between a motion of a person and a setting condition of the indoor unit shown in FIG. 1.
Figure 5D:
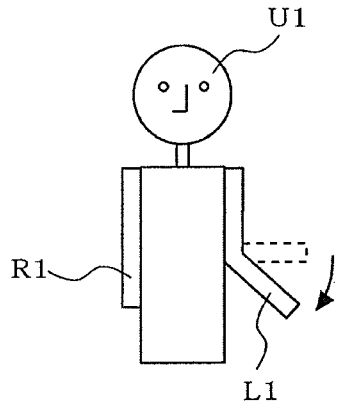
FIG. 5D provides a schematic view showing the relationship between a motion of a person and a setting condition of the indoor unit shown in FIG. 1.
Figure 6A:
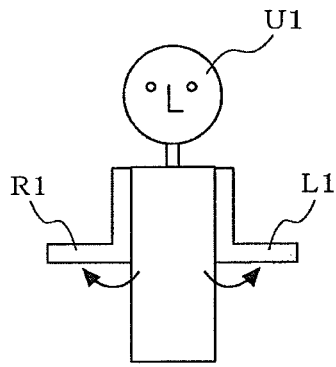
FIG. 6A provides a schematic view showing the relationship between a motion of a person and a setting condition of the indoor unit shown in FIG. 1.
Figure 6B:
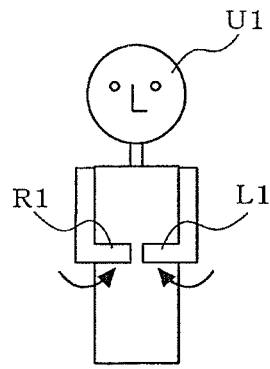
FIG. 6B provides a schematic view showing the relationship between a motion of a person and a setting condition of the indoor unit shown in FIG. 1.
Figure 6C:
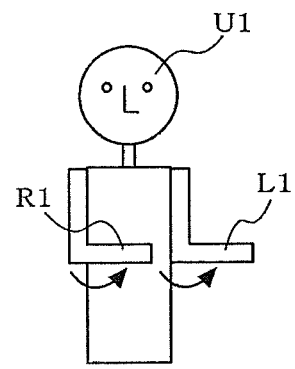
FIG. 6C provides a schematic view showing the relationship between a motion of a person and a setting condition of the indoor unit shown in FIG. 1.
Figure 6D:
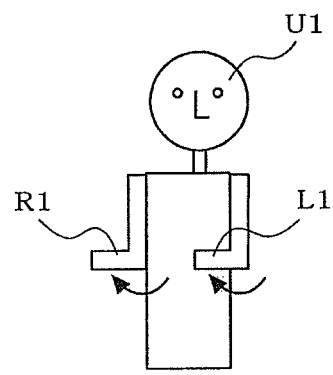
FIG. 6D provides a schematic view showing the relationship between a motion of a person and a setting condition of the indoor unit shown in FIG. 1.
Figure 7A:
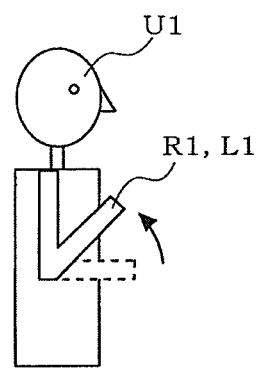
FIG. 7A provides a schematic view showing the relationship between a motion of a person and a setting condition of the indoor unit shown in FIG. 1.
Figure 7B:
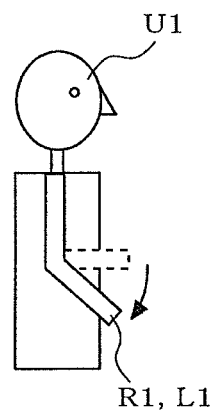
FIG. 7B provides a schematic view showing the relationship between a motion of a person and a setting condition of the indoor unit shown in FIG. 1.

FIGS. 1 to 5 explain an indoor unit of an air-conditioning apparatus according to Embodiment 1 of the present invention. FIG. 1 is a front view. FIG. 2 is a cross section in a side view. FIG. 3 is a front view of a wireless remote controller. FIG. 4 is a perspective view showing extracted part (around an air outlet). FIGS. 5 to 7 are schematic illustrations each showing the relationship between a motion of a person and a gesture setting condition. FIG. 8 is a flowchart showing a display flow of the gesture setting condition. It is to be noted that the respective drawings are schematically illustrated, and the present invention is not limited to Embodiment 1 shown in the drawings.

(Indoor Unit)

In FIGS. 1 and 2, an indoor unit 100 of the air-conditioning apparatus (hereinafter, called "indoor unit") includes a main body 1 having an air inlet 3 formed in an upper portion and an air outlet 7 formed in a lower portion, a front panel 2 that covers a front surface of the main body 1 in a manner that the front panel 2 can be opened and closed, a fan 5 that sucks the indoor air from the air inlet 3 and forms an air path 6 to the air outlet 7, and a heat exchanger 4 arranged upstream of the fan 5 (near the air inlet 3).

Also, a main-body communication device 40 that makes communication with (sends and receives a signal to and from) an wireless remote controller (hereinafter, called "remote controller") 80, an image pickup device 50 that captures an image of a state in the room, and a controller 70 (a portion of the front panel 2 being schematically shown in a perspective manner) that controls the heat exchanger (correctly, a refrigeration cycle including the heat exchanger) based on information of a user U1 whose image is captured by the image pickup device 50 and causes the main-body communication device 40 to make communication with the remote controller 80 by using a signal are provided at positions beside the air outlet 7 at the front surface of the main body 1.

The present invention does not limit the models and installation positions of the main-body communication device 40 and the image pickup device 50. For example, the main-body communication device 40 and the image pickup device 50 may be installed in a center portion or other portion of the front panel 2.

The heat exchanger 4 includes a heat-exchanger front portion 4a that is a portion being substantially parallel to the front panel 2, a heat-exchanger upper front portion 4b that is a portion near a front side of the fan 5 and extending obliquely upward, and a heat-exchanger upper rear portion 4c that is a portion near a rear side of the fan 5 and extending obliquely upward. Also, a drain pan 8 is arranged below the heat-exchanger front portion 4a. An upper surface 8a of the drain pan 8 forms a drain pan surface that actually receives drain. A lower surface 8b of the drain pan 8 forms a front side of the air path 6.

(Wireless Remote Controller)

In FIG. 3, the remote controller 80 sets an air-conditioning condition, sends a signal corresponding to the air-conditioning condition to the main body 1 (the main-body communication device 40), and receives a "signal corresponding to a gesture setting condition" (described later) from the main body 1. The remote controller 80 includes an input device 81 with which the user U1 inputs an operation condition (hereinafter, called "remote-controller instruction condition"), a wireless-remote-controller display device (hereinafter, called "remote-controller display device") 82 that displays the input operation condition or the gesture setting condition received from the main body 1, a remote-controller sound output device 83 that outputs voice, a remote-controller sound-output stop button 84 that stops the output of sound from the remote-controller sound output device 83, and a wireless-remote-controller communication device (hereinafter, called "remote-controller communication device") 85 that allows communication with the main body 1. Alternatively, the remote-controller sound-output stop button 84 may be omitted.

(Wind-Direction Adjusting Device)

In FIGS. 2 and 4, a left horizontal wind-direction plate group 10L and a right horizontal wind-direction plate group 10R (these are collectively or individually called "horizontal wind-direction plate 10") that adjust a blowing direction of the indoor air conditioned by the heat exchanger 4 (hereinafter, called "conditioned air") in the horizontal direction (left-right direction) are provided at positions near the air outlet 7 of the air path. A vertical wind-direction plate 9 (a front vertical wind-direction plate 9a and a rear vertical wind-direction plate 9b are collectively called "vertical wind-direction plate 9") that adjusts a blowing direction of the conditioned air in the vertical direction (up-down direction) is provided at the air outlet 7 that is an end of the air path 6.

It is to be noted that the "left" and "right" respectively represent "left" and "right" when the inside of the room is viewed from the indoor unit 100, that is, when the front panel 2 is viewed from the rear surface of the main body 1.

(Vertical Wind-Direction Plate)

In FIG. 2, the vertical wind-direction plate 9 has a rotation center that is parallel to the horizontal direction, and is rotatably arranged at the main body 1. A rotation shaft of the front vertical wind-direction plate 9a is coupled with a rotation shaft of the rear vertical wind-direction plate 9b through a link mechanism or a gear mechanism. The rotation shafts are rotated by a common driving motor.

In the present invention, the form of the vertical wind-direction plate 9 is not limited to the illustrated form. The front vertical wind-direction plate 9a and the rear vertical wind-direction plate 9b may be respectively driven by different driving motors. Alternatively, each of the front and rear vertical wind-direction plates 9a and 9b may be divided into two at the center in the left-right direction, to be four parts in total, and the divided parts may be individually and independently rotated.

(Horizontal Wind-Direction Plate)

In FIG. 4, the right horizontal wind-direction plate group 10R includes horizontal wind-direction plates 10a, 10b, . . . , and 10g, are rotatably arranged at the lower surface 8b of the drain pan 8, and are coupled with a right coupling rod 20R. Also, the left horizontal wind-direction plate group 10L includes horizontal wind-direction plates 10h, 10i, . . . , and 10n, and are coupled with a left coupling rod 20L.

The right horizontal wind-direction plate group 10R and the right coupling rod 20R form a link mechanism. The left horizontal wind-direction plate group 10L and the left coupling rod 20L form a link mechanism. The right coupling rod 20R is coupled with right driving means (not shown). The left coupling rod 20L is coupled with left driving means 30L.

Hence, when the right coupling rod 20R is translated by the right driving means, the horizontal wind-direction plates 10a, 10b, . . . , and 10 g are rotated while being continuously parallel to each other. When the left coupling rod 20L is translated by the left driving means 30L, the horizontal wind-direction plates 10h, 10i, . . . , and 10n are rotated while being continuously parallel to each other. Hence, the conditioned air from the entire-width area of the air outlet 7 can be blown in the same direction, the conditioned air from the half-width area of the air outlet 7 and the conditioned air from the other half-width area of the air outlet 7 can be blown in directions to be separated from each other, or the conditioned air from the half-width area of the air outlet 7 and the conditioned air from the other half-width area of the air outlet 7 can be blown in directions to collide with each other.

In the present invention, the form of the horizontal wind-direction plate 10 is not limited to the illustrated from. The number of plates of the horizontal wind-direction plate 10 may be any number. The horizontal wind-direction plate 10 may be divided into three or more groups, the groups may be respectively rotatably joined with coupling rods, and the coupling rods may be individually and independently translated.

(Gesture Setting Condition: Temperature Setting)

In part (a) of FIG. 5, based on information of the user U1 whose image is captured by the image pickup device 50, if the controller 70 recognizes that the user U1 performs a motion of swinging a right forearm part R1 upward one time from a substantially horizontal state, the controller determines that an instruction is made for increasing the setting temperature by 0.5° C., and if the controller 70 recognizes that the user U1 continuously performs the motion two times, the controller 70 determines that an instruction is made for increasing the setting temperature by 1.0° C. That is, if the user U1 continuously performs the motion N times, the setting temperature can be increased by "N times of 0.5° C." Alternatively, instead of the right forearm part R1, a motion of swinging the entire right arm upward from a substantially horizontal state may be performed.

In part (b) of FIG. 5, if the user U1 continuously performs a motion of swinging the right forearm part R1 downward N times from the substantially horizontal state, the controller 70, which recognizes the motion, determines that an instruction is made for decreasing the setting temperature by "N times of 0.5° C."

(Gesture Setting Condition: Blowing Strength)

In part (c) of FIG. 5, if the controller 70 recognizes that the user U1 performs a motion of swinging a left forearm part L1 upward one time from a substantially horizontal state, the controller 70 determines that an instruction is made for increasing the blowing strength of the conditioned air by one step (for example, changing the blowing strength from medium to high). Also, if the controller 70 recognizes that the motion is continuously performed two times, the controller 70 determines that an instruction is made for increasing the blowing strength of the conditioned air by two steps (for example, changing the blowing strength from medium to maximum). That is, if the user U1 continuously performs the motion N times, the blowing strength can be increased by "N steps." Alternatively, instead of the left forearm part L1, a motion of swinging the entire left arm upward from a substantially horizontal state may be performed.

In part (d) of FIG. 5, if the user U1 continuously performs a motion of swinging the left forearm part L1 downward from the substantially horizontal state N times, it is determined that an instruction is made for decreasing the blowing strength by "N steps."

(Gesture Setting Condition: Blowing Range)

In part (a) of FIG. 6, if the controller 70 recognizes that the user U1 performs a motion of moving the distal end (fingers) of the part L1 leftward (rotating the left elbow), moving the distal end (fingers) of the part R1 rightward (rotating the right elbow), and hence moving the left and right fingers away from each other from a state in which the left and right forearm parts L1 and R1 are substantially horizontal and substantially parallel to each other, the controller 70 determines that an instruction is made for increasing the blowing angle of the conditioned air by one step. By continuously performing the motion N times, the left-right blowing angle can be increased by "N steps." Alternatively, instead of the forearm parts L1 and R1, a motion of swinging the entire left and right arms upward from a substantially horizontal state may be performed.

In part (b) of FIG. 6, if the controller 70 recognizes that the user U1 performs a motion of moving the distal end (fingers) of the part L1 rightward (rotating the left elbow), moving the distal end (fingers) of the part R1 leftward (rotating the right elbow), and hence moving the left and right fingers toward each other from the state in which the left and right forearm parts L1 and R1 are substantially horizontal and substantially parallel to each other, the controller 70 determines that an instruction is made for decreasing the left-right blowing angle of the conditioned air by one step. By continuously performing the motion N times, the blowing angle can be decreased by "N steps."

(Gesture Setting Condition: Blowing Horizontal Direction)

In part (c) of FIG. 6, if the controller 70 recognizes that the user U1 performs a motion of moving the distal end (fingers) of the part L1 leftward (rotating the left elbow), moving the distal end (fingers) of the part R1 leftward (rotating the right elbow), and hence moving the parts L1 and R1 leftward while being substantially parallel to each other from the state in which the left and right forearm parts L1 and R1 are substantially horizontal and substantially parallel to each other, the controller 70 determines that an instruction is made for changing the blowing direction in the left-right direction of the conditioned air leftward (rightward when viewed from the main body 1) of the user U1 by one step. By continuously performing the motion N times, the blowing direction can be changed leftward (rightward when viewed from the main body 1) by "N steps."

In part (d) of FIG. 6, if the controller 70 recognizes that the user U1 performs a motion of moving the distal end (fingers) of the part L1 rightward (rotating the left elbow), moving the distal end (fingers) of the part R1 rightward (rotating the right elbow), and hence moving the parts L1 and R1 rightward while being substantially parallel to each other from the state in which the left and right forearm parts L1 and R1 are substantially horizontal and substantially parallel to each other, the controller 70 determines that an instruction is made for changing the blowing direction in the left-right direction of the conditioned air rightward (leftward when viewed from the main body 1) of the user U1 by one step. By continuously performing the motion N times, the blowing direction can be changed rightward (leftward when viewed from the main body 1) by "N steps."

(Gesture Setting Condition: Blowing Vertical Direction)

In part (a) of FIG. 7, if the controller 70 recognizes that the user U1 performs a motion of raising the left and right forearm parts L1 and R1 (bending the elbows) from the state in which the left and right forearm parts L1 and R1 are substantially horizontal and substantially parallel to each other, the controller 70 determines that an instruction is made for changing the blowing direction in the up-down direction upward by one step. By continuously performing the motion N times, the blowing direction can be changed upward by "N steps."

In part (b) of FIG. 7, if the controller 70 recognizes that the user U1 performs a motion of lowering the left and right forearm parts L1 and R1 (stretching the elbows) from the state in which the left and right forearm parts L1 and R1 are substantially horizontal and substantially parallel to each other, the controller 70 determines that an instruction is made for changing the blowing direction in the up-down direction downward by one step. By continuously performing the motion N times, the blowing direction can be changed downward by "N steps."

(Display Flow of Gesture Setting Condition)

In FIG. 8, if the user U1 whose image is captured by the image pickup device 50 performs the same (or a similar) motion as (to) any of previously registered motions (hereinafter, called "gestures") as shown in FIGS. 5 to 7 (S1-1), the controller 70 determines one of the previously registered gestures corresponding to the motion (S1-2). Then, the controller 70 recognizes that an instruction is made for change to the air-conditioning condition corresponding to the determined gesture (for example, increasing the temperature) (S1-3). It is to be noted that the air-conditioning condition changed by the gesture is called "gesture instruction condition."

The controller 70 controls at least one of the fan 5 and the heat exchanger 4 (correctly, the refrigeration cycle including the heat exchanger 4) based on the gesture instruction condition (S1-4). Also, the controller 70 causes the main-body communication device 40 to send a signal corresponding to the gesture instruction condition (hereinafter, called "gesture instruction signal") to the remote-controller communication device 85 (S1-5).

Then, when the remote-controller communication device 85 of the remote controller 80 receives the gesture instruction signal (S1-6), the remote-controller display device 82 displays the gesture instruction condition (S1-7), and the remote-controller sound output device 83 outputs buzzer sound (electronic beeper sound), for example, two short beeps "peep, peep" (S1-8).

If the remote-controller sound-output stop button 84 is pressed (S1-9), or if the buzzer sound (the electronic beeper sound) is output a predetermined number of times (S1-10), the output of the sound is stopped (S1-11), forcibly (S1-9) or automatically (S1-10).

As described above, if the user U1 performs a predetermined motion, the indoor unit 100 is operated based on the gesture instruction condition which is the air-conditioning condition corresponding to the motion (the gesture), and the gesture instruction condition is displayed on the remote-controller display device 82. Accordingly, the synchronization of default (reference) is provided.

Hence, the uncomfortable feeling of the user U1 because of the asynchronization of default (reference) is addressed. If the air-conditioning condition is set based on the air-conditioning condition displayed on the remote-controller display device 82, a desirable air-conditioning condition can be provided. Further, when the air-conditioning condition is changed by the gesture, since the air-conditioning condition which is the same as the gesture instruction condition (which is the same as the air-conditioning condition intended by the user U1) does not have to be set in the remote controller 80 again, the convenience is increased.

Also, since the remote-controller sound output device 83 outputs the buzzer sound (the electronic beeper sound) when the remote-controller communication device 85 receives the gesture instruction signal, the user U1 understands that the motion performed by the user is recognized by the main body 1 (the controller 70). Hence, the user does not have to worry about whether the motion is recognized or not. Further, the user can understand whether the motion of the user is recognized or not as intended by the user when the user looks the gesture instruction condition displayed on the remote-controller display device 82. If the gesture instruction condition is different from one intended by the user, an additional motion can be performed at this time, and the intended air-conditioned environment can be provided. Accordingly, comfortable air-conditioned environment can be obtained. Also, a remote-controller instruction condition input to the remote controller 80 may be sent to the main body 1, and the remote-controller instruction condition can be changed based on the air-conditioning condition.

Embodiment 2

Figure 9:
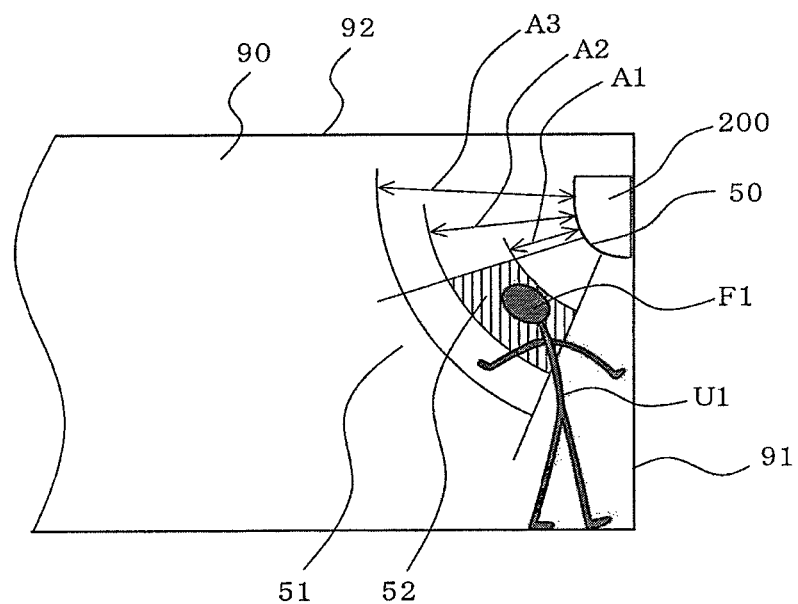
FIG. 9 is a side view showing a function (recognition by face recognition) for explaining an indoor unit of an air-conditioning apparatus according to Embodiment 2 of the present invention.
Figure 11:
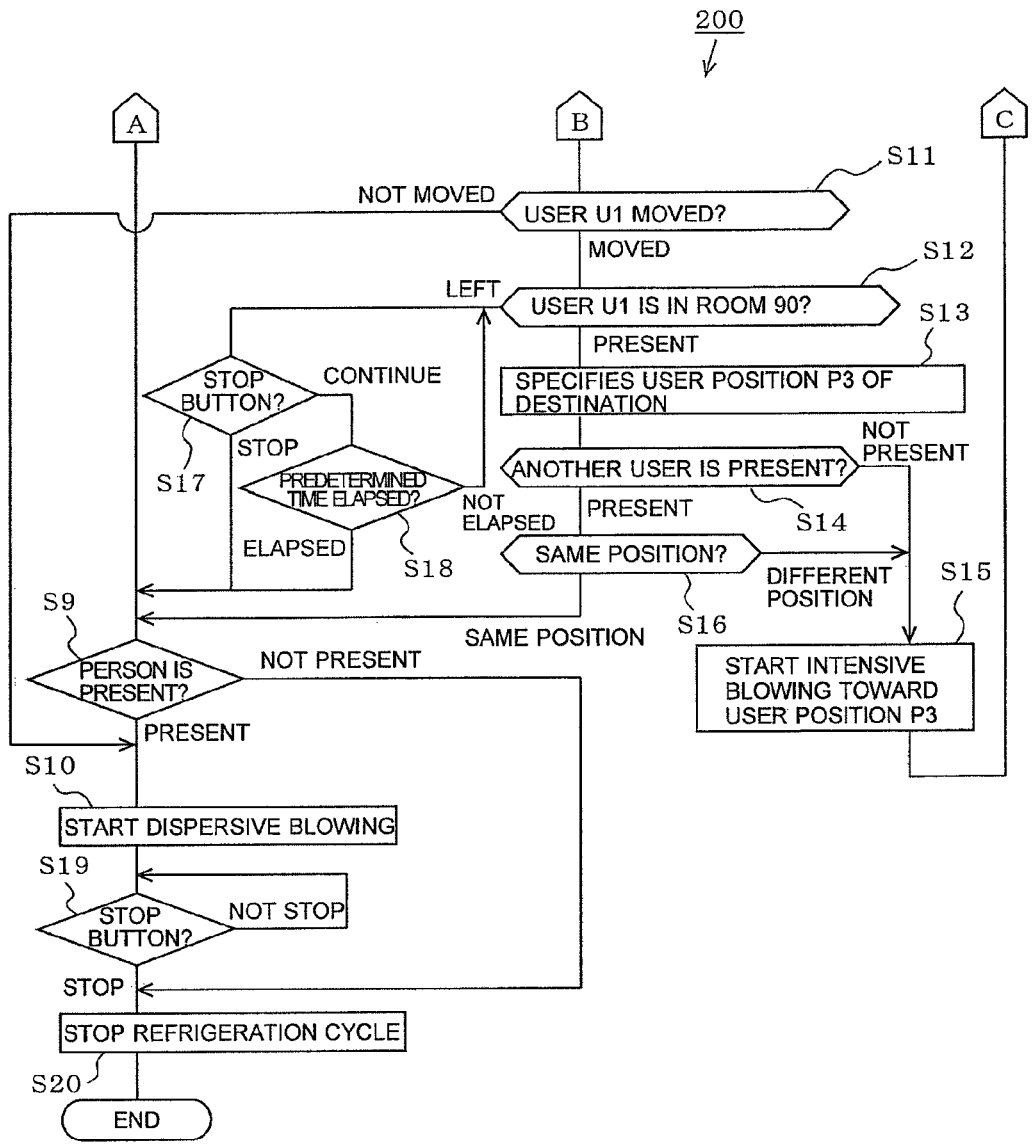
FIG. 11 is a flowchart showing a flow of control of the indoor unit shown in FIG. 9.
Figure 12A:
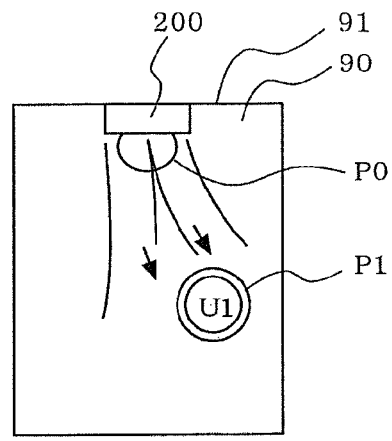
FIG. 12A provides a plan view showing wind-direction control of the indoor unit shown in FIG. 9.
Figure 12B:
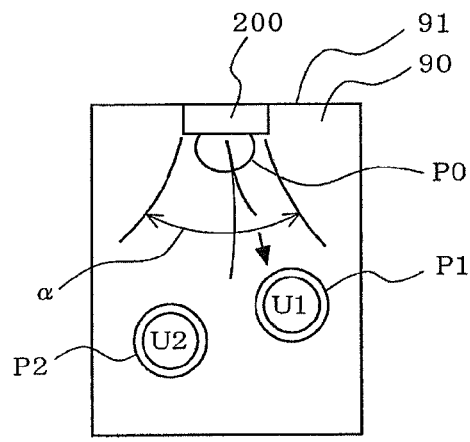
FIG. 12B provides a plan view showing wind-direction control of the indoor unit shown in FIG. 9.
Figure 12C:
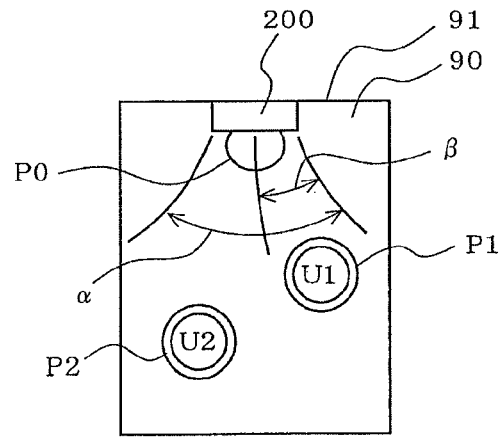
FIG. 12C provides a plan view showing wind-direction control of the indoor unit shown in FIG. 9.
Figure 13A:
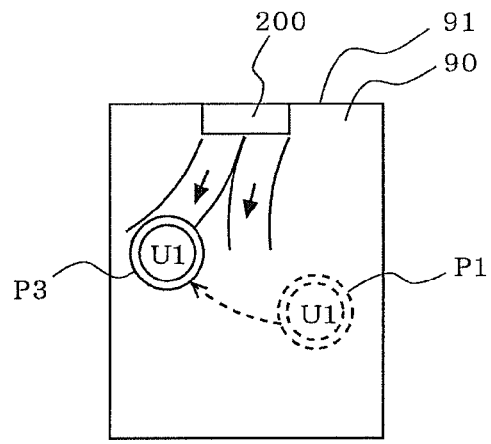
FIG. 13A provides a plan view showing wind-direction control of the indoor unit shown in FIG. 9.
Figure 13B:
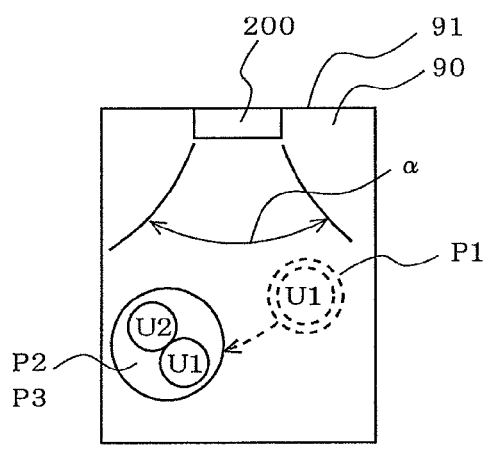
FIG. 13B provides a plan view showing wind-direction control of the indoor unit shown in FIG. 9.
Figure 13C:
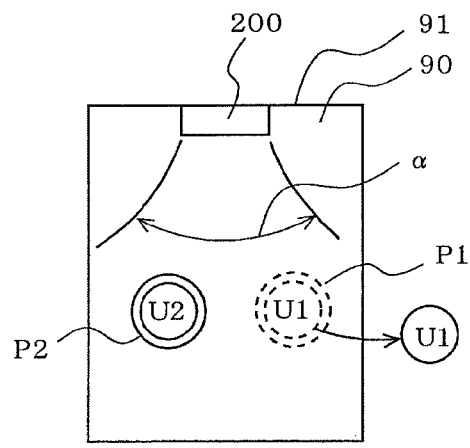
FIG. 13C provides a plan view showing wind-direction control of the indoor unit shown in FIG. 9.

FIGS. 9 to 11 explain an indoor unit of an air-conditioning apparatus according to Embodiment 2 of the present invention. FIG. 9 is a side view showing a function (recognition by face recognition). FIGS. 10 and 11 are flowcharts each showing a flow of control. FIGS. 12 and 13 are plan views each showing wind-direction control. Parts the same as or corresponding to those in Embodiment 1 refer the same reference signs, and the description is partly omitted. It is to be noted that the respective drawings are schematically illustrated, and the present invention is not limited to Embodiment 2 shown in the drawings.

(Controller)

An indoor unit 200 of an air-conditioning apparatus (hereinafter, called "indoor unit") corresponds to a configuration in which a function of controlling the temperature and blowing amount of the conditioned air (hereinafter, called "wind-direction control") depending on the demand of a user (a resident) who is sensitive to heat or sensitive to cold is added to the controller 70 of the indoor unit 100 (see Embodiment 1). The other functions are similar to those of the indoor unit 100, and description for the equivalent portions is omitted.

That is, the indoor unit 200 can be activated (the refrigeration cycle etc. can start its operation) although the user U1 does not operate the remote controller 80, and the air-conditioning condition can be changed by the gesture of the user U1 although the user U1 does not operate the remote controller 80. In addition, the changed air-conditioning condition (the gesture instruction condition) is displayed on the display device 82. Further, the location (or the destination) of the user U1 is specified, and the conditioned air is sent to the specified position.

Hence, the user U1 has to cause the controller to recognize that the user U1 is the "person who is sensitive to heat or cold." The user U1 has to approach the indoor unit 200, and cause the indoor unit 200 to recognize user's face.

The controller 70 determines that the user U1, who approaches the indoor unit 200 and causes the indoor unit 200 to recognize the face, is the "person who is sensitive to heat or cold," tracks the movement of the user U1, and specifies the location of the user U1. Then, the postures of the horizontal wind-direction plate 10 and the vertical wind-direction plate 9 are controlled (hereinafter, called "wind-direction intensive control"), so that the conditioned air is locally (regionally) directed intensively to the specified location (hereinafter, called "intensive blowing").

In contrast, if there is not a user who is sensitive to heat or cold (if there is not a user who approaches the indoor unit 200 and causes the indoor unit 200 to recognize user's face), the postures of the horizontal wind-direction plate 10 and the vertical wind-direction plate 9 are controlled (hereinafter, called "wind-direction dispersive control"), so that the conditioned air is directed substantially uniformly in the room, or a predetermined blowing mode (for example, a blowing mode in which the conditioned air does not directly hit a specific user) is provided (hereinafter, called "dispersive blowing").

Further, if the user U1 performs the predetermined motion described in Embodiment 1, the air-conditioning condition is changed to the gesture instruction condition corresponding to the motion. The gesture instruction condition is displayed on the remote-controller display device 82, and the change to the gesture instruction condition is notified by the buzzer sound.

(Recognition for Face of User)

FIG. 9 explains a procedure of recognition for the face of the user. The indoor unit 200 is installed on a wall (hereinafter, called "rear wall") 91 in a room 90, at a position near a ceiling 92.

In FIG. 9, the image pickup device (for example, a CCD camera with 300,000 pixels) 50 has a field 51 toward an obliquely lower side. When a face F1 of the user U1 is present within a range (indicated by oblique lines in the drawing, called "face recognition range") 52 between a distance A1 and a distance A2 (>A1) from the image pickup device 50 in the field 51, the controller recognizes the face F1.

Further, when the user U1 approaches the indoor unit 200 and is present at a distance smaller than a distance A3 (>A2) from the image pickup device 50, the controller determines that "the user U1 intends to cause the indoor unit 200 to recognize that the user U1 is sensitive to heat or cold." If the face F1 is not present within the face recognition range 52 although the user U1 is present at a distance smaller than the distance A3, the controller causes notification means (not shown) to make notification about the situation.

For example, the notification means makes notification, "a face cannot be recognized" or "please come closer" by voice, or causes a lamp indicative of that the face cannot be recognized to be lit or blinked. Alternatively, the notification means may display characters or an image instead of the voice or the lighting or blinking of the lamp.

In contrast, if the face F1 is not recognized (if the face F1 is not within the face recognition range 52) when a predetermined time (for example, 10 seconds) has elapsed although the user U1 is present at a distance smaller than the distance A3 (>A2) from the image pickup device 50, the controller determines that "the user U1 does not cause the indoor unit 200 to recognize that the user U1 is sensitive to heat or cold," or "the user U1 is not sensitive to heat or cold." That is, the controller determines that the wind-direction intensive control is not required.

At this time, the notification means (not shown) may be caused to make notification about the situation. For example, the notification is made by voice like "operation being in normal mode," or the lamp indicative of "operation in normal mode" is lit or blinked.

(Tracking of User)

After the face F1 of the user U1 is recognized, the controller tracks the user U1 based on the image of the user U1 captured by the image pickup device 50, and specifies the destination (hereinafter, called "user position") P1. Then, the conditioned air is locally sent intensively to the specified user position P1 (intensive blowing is performed).

Immediately after the face F1 is recognized, since the user U1 moves away from the indoor unit 200, after the movement, the stop position or sitting position of the user U1 is specified as the user position P1.

(Wind-Direction Control)

The wind-direction control executed by the controller is described with reference to the flowcharts shown in FIGS. 10 and 11 and the plan views in FIGS. 12 and 13.

Referring to FIGS. 10 and 11, if the face F1 of the user U1 is present within the face recognition range 52 (S1), the controller recognizes the face F1 (S2). Then, it is determined whether the refrigeration cycle is in operation (in cooling operation, in heating operation, etc.) (S3). If the refrigeration cycle is stopped, the refrigeration cycle is activated (S4).

Also, the movement of the user U1 is tracked (S5). The user position P1, which is the stop position or the sitting position of the user U1, is specified (S6). Then, the postures of the horizontal wind-direction plate 10 and the vertical wind-direction plate 9 are controlled so that the conditioned air is intensively and locally sent toward the user position P1 (intensive blowing is performed) (S7).

Since the intensive blowing toward the user position P1 is started, a person who is sensitive to heat (or cold) other than the user U1 who is sensitive to heat (or cold) can intensively receive the conditioned air if the person who is sensitive to heat (or cold) is present at the user position P1. It is to be noted that the user U1 who is sensitive to heat (or cold) receives the conditioned air at a position different from a user position P2 at which a user U2 who is not sensitive to heat (or cold) is located.

(Intensive Blowing)

In part (a) of FIG. 12, if the user position P1 is at the left side in the room 90 (at the left when viewed from the indoor unit 200), both the right horizontal wind-direction plate group 10R and the left horizontal wind-direction plate group 10L (see FIG. 4) are arranged in postures with which the conditioned air is blown toward the user position P1 (postures of intensive blowing). Hence, the user U1 intensively receives the conditioned air for a longer time or by a larger amount as compared with a case in which the conditioned air is blown substantially uniformly in the room 90 (dispersive blowing).

That is, when the user U1 who is sensitive to heat (or cold) enters the room 90 from the outside at a high (or low) temperature, the user U1 does not have to search for the remote controller or does not have to perform an operation of pressing a start button for cooling (or heating) arranged on the remote controller. Cooling (or heating) operation can be started when the face F1 of the user U1 approaches the indoor unit 200. Also, as long as the user moves and stops or sits at the predetermined position, the position is automatically specified as the user position P1, and cooling air (or heating air) is sent toward the user position P1. The remote controller or the like does not have to be operated so that the conditioned air reliably reaches the user position.

Accordingly, convenience and comfortableness are increased. That is, local "cooling (cool) mode" is provided for the person who is sensitive to heat, and local "heating (hot) mode" is provided for the person who is sensitive to cold.

The airflow of the blown conditioned air seems to be a bundle of the conditioned air with a cross section of substantially the same as the size of the air outlet, and with a substantially uniform flow rate. However, the airflow is mixed with the ambient air and spread while flowing in the room 90. When the airflow actually reaches the user position P1, the airflow has a larger cross section than the size of the air outlet, and even in the cross section, there are bundles of the airflows with various flowing directions at various flow rates are.

Owing to this, "being locally intensive" or "intensive blowing" according to the present invention represents that the center obtained when the spreading airflows are averaged is "directed toward the specific position," and represents that the conditioned air reaches the periphery of the user position P1.

In the above description, both the right horizontal wind-direction plate group 10R and the left horizontal wind-direction plate group 10L blow the conditioned air toward the user position P1. However, the procedure of the intensive blowing of the present invention is not limited thereto.

For example, as shown in part (b) of FIG. 12, the left horizontal wind-direction plate group 10L may be fixed in a posture for blowing the conditioned air toward the user position P1, and the right horizontal wind-direction plate group 10R may rotate (swing) to blow the conditioned air while reciprocating in a predetermined range (in the drawing, indicated by a) containing the user position P1 and the user position P2. Then, the conditioned air is intensively blown by a large amount to the user U1 who is sensitive to heat (or cold). The comfortableness of the user U1 is increased, and the conditioned air is intermittently blown by a small amount in a range excluding the user position P1.

Hence, If the user U2 whose sensitive temperature is different from that of the user U1 and who is not sensitive to heat (or cold) is located at the user position P2 different from the user position P1, the conditioned air is intermittently blown by a small amount toward the user position P2. The comfortableness of the user U2 is maintained.

Further, as shown in part (c) of FIG. 12, both the right horizontal wind-direction plate group 10R and the left horizontal wind-direction plate group 10L may blow the conditioned air while rotating (swinging) within the predetermined range (in the drawing, indicated by a) containing the user position P1 and the user position P2, and the swing speed may be decreased (the blowing time may be increased) in a range facing the user P1 (in the drawing, indicated by β) as compared with the other range. Then, like the case shown in part (b) of FIG. 12, the comfortableness of the user U1 who is sensitive to heat (or cold) and the user U2 who is not sensitive to heat (or cold) is maintained.

The selection of the procedure of the intensive blowing (selection of any of part (a), part (b), and part (c) of FIG. 12) may be previously determined. Alternatively, the user U1 who is sensitive to heat (or cold) may make determination or change by using the remote controller or the like when the intensive blowing is started or after the intensive blowing is started.

In FIG. 11, during the execution of the intensive blowing, if the user U1 or the other user U2 operates the remote controller 80 and presses a button for stopping the intensive blowing (S8 in FIG. 10), the controller stops the intensive blowing, and starts dispersive blowing (S10). That is, the conditioned air is not intensively blown toward the user position P1, but the dispersive blowing is started.

In contrast, during the execution of the intensive blowing, if the button for stopping the intensive blowing is not pressed (S8), the controller continues the tracking for the position of the user U1 whose face F1 is recognized.

Then, if it is determined that the user U1 is located at the user position P1 for a predetermined time (for example, 30 minutes) without move from the position (S11), the intensive blowing is stopped, and the dispersive blowing is started (S10). That is, the user U1 who is sensitive to heat (or cold) is cooled (or heated) by the intensive blowing for the predetermined time, and it is expected that the user U1 feels comfortable even if the mode is changed to normal cooling (heating).

In contrast, if it is determined that the user U1 moves before the predetermined time elapses (for example, 30 minutes) (S11), it is further determined that the user U1 is located in the room 90 or outside the room 90 (S12).

If it is determined that the user U1 is located in the room 90, a user position P3 that is the destination of the user U1 is specified (S13). If it is determined that the other user is not in the room 90 (S14), the intensive blowing toward the user position P3 is started instead of the intensive blowing toward the user position P1 (S15, see part (a) of FIG. 13).

In contrast, if it is determined that the other user is present, the user position P2 at which the other user U2 (who is not sensitive to heat (or cold)) is specified, and it is determined whether or not the user position P3 that is the destination of the user U1 corresponds to the user position P2 (S16).

If it is determined that the user U1 moves to the user position P2 (if the user position P3 corresponds to the user position P2) in S16, the intensive blowing is stopped, and the dispersive blowing is started (S10, see part (b) of FIG. 13). That is, the comfortableness of the other user U2 is not disturbed.

In contrast, if it is determined that the user U1 moves to a position other than the user position P2 (if the user position P3 is different from the user position P2), the intensive blowing toward the user position P3 that is the destination is started instead of the intensive blowing toward the user position P1 (S15, see part (b) of FIG. 13).

After it is determined that the user U1 leaves the room 90 in S12, if the button for stopping the intensive blowing is pressed (S17), as long as a user is located in the room 90 (S9), the intensive blowing is stopped, and the dispersive blowing is started (S10). In contrast, after the user U1 leaves the room 90, if a predetermined time (for example, 10 minutes) elapses (S18), as long as a user is located in the room 90 (S9), the intensive blowing is stopped, and the dispersive blowing is started (S10, see part (c) of FIG. 13). That is, after the user U1 leaves the room 90, regardless of whether the user U1 returns or not, as long as anyone (a user) is located in the room 90, the blowing is changed to the dispersive blowing when the predetermined time (time) has elapsed since the intensive blowing is started.

If it is determined that no one is in the room (a user is not present) in S9, the refrigeration cycle is stopped (S20). Also, if it is determined that a user is located in the room in S9, the intensive blowing is stopped, and the dispersive blowing is started (S10).

Further, during the dispersive blowing, if anyone (a user) operates the remote controller 80 and presses the button for stopping the dispersive blowing (stop button for cooling or heating etc.) (S19), the operation of the refrigeration cycle is stopped (S20).

Embodiment 3

Figure 14:
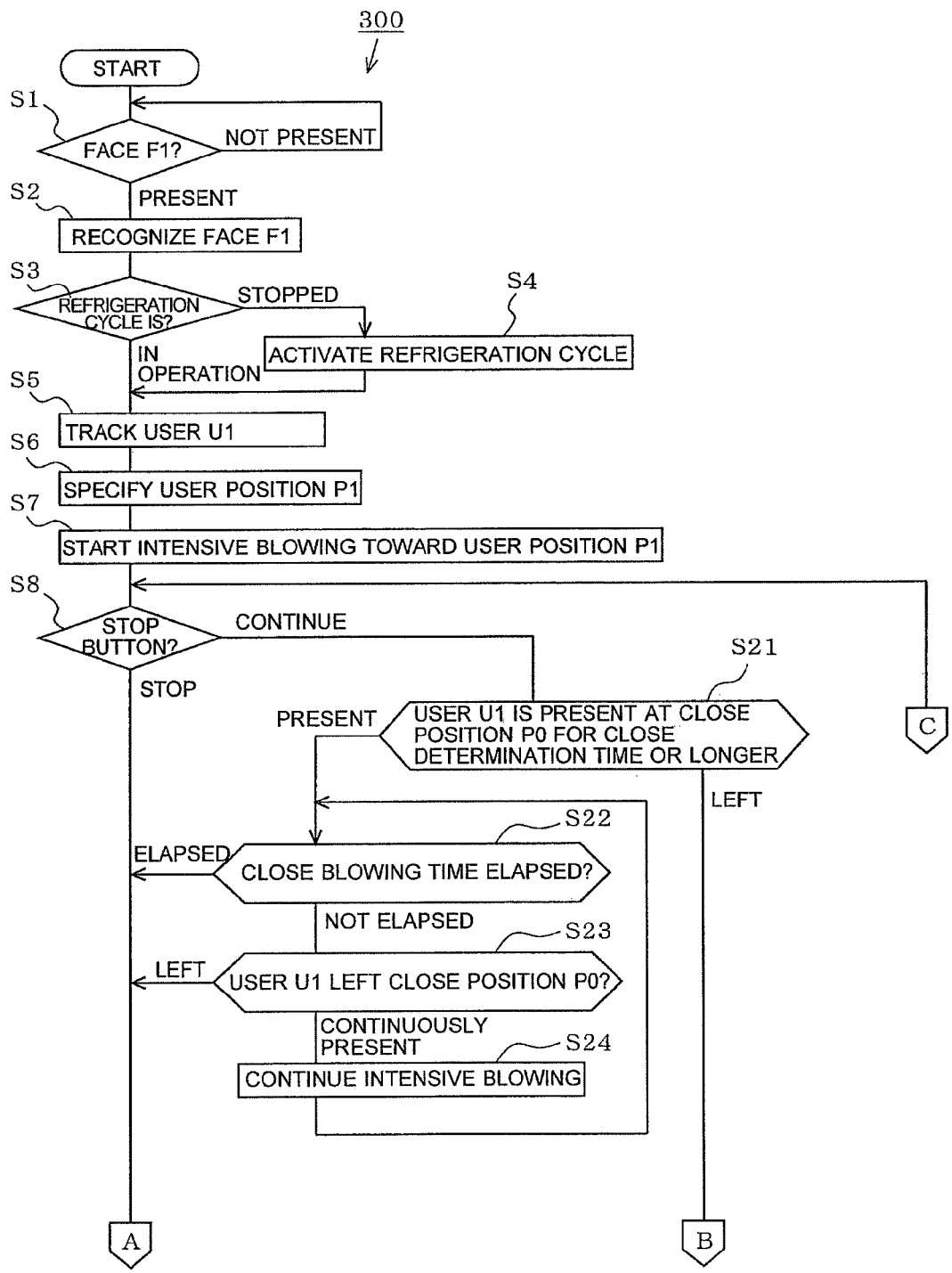
FIG. 14 is a flowchart for explaining an indoor unit of an air-conditioning apparatus according to Embodiment 3 of the present invention.

FIG. 14 is a flowchart for explaining an indoor unit of an air-conditioning apparatus according to Embodiment 3 of the present invention. Parts the same as or corresponding to those in Embodiments 1 and 2 refer the same reference signs, and the description is partly omitted.

An indoor unit 300 of an air-conditioning apparatus (hereinafter, called "indoor unit") according to Embodiment 3 responds to a demand of a user U1 who wants to be temporarily rapidly cooled immediately after the user takes a bath or the user enters the room from the hot (or cold) outdoor environment (hereinafter, called "bathed person").

In particular, the indoor unit 200 according to Embodiment 2 tracks the movement of the user U1 whose face is recognized, and provides the intensive blowing toward the user position P1 that is the destination (see S7 in FIG. 10). If the user U1 is continuously located at the user position P1, which is the destination, for a predetermined time (for example, 30 minutes), when the predetermined time has elapsed (for example, 30 minutes), the intensive blowing is stopped, and the dispersive blowing is started (see S10 and S11 in FIG. 11).

Hence, with the indoor unit 100 according to Embodiment 1, the bathed person activates the indoor unit 100 through the face recognition of the bathed person immediately after the person takes a bath, continuously stands at the close position P0 of the indoor unit 100 (the position at which the face F1 of the user U1 is present within the face recognition range 52, and a relatively narrow area containing the range, see FIG. 12), and if the user leaves the close position P0 after the close determination time (for example, 10 minutes) which is a predetermined time elapses, the intensive blowing is continued toward the moving bathed person. At this time, the bathed person may not desire the intensive blowing but may desire the dispersive blowing. The indoor unit 200 according to Embodiment 2 corresponds to this situation.

In FIG. 14, when the indoor unit 300 starts the intensive blowing toward the user position P1 near the close position P0 (S7), and when the intensive blowing is continued (S8), it is determined whether or not the user U1 is continuously located (continuously stands) at the close position P0 even if a close determination time (for example, 30 seconds) which is a predetermined time has elapsed (S21).

That is, if the user U1 is the "bathed person," the intensive blowing is executed toward the close position P0 (at this time, the user position P1 corresponds to the close position P0). Hence, the user U1 can be cooled at the close position P0 (S22). The intensive blowing is continued for a close blowing time (for example, 10 minutes) which is a predetermined time until the cooling down is finished (S22). When the close blowing time (for example, 10 minutes) has elapsed, the blowing is shifted to the dispersive blowing (see S9 and S10 in FIG. 11).

If the user U1 finishes the cooling down and leaves the close position P0 before the close blowing time (for example 10 minutes) elapses (S23), when the user U1 leaves the close position P0, the blowing is shifted to the dispersive blowing (see S9 and S10 in FIG. 11).

In contrast, if the user U1 is not the "bathed person," after the face is recognized at the close position P0, the person leaves the close position P0 before the close determination time (for example, 30 seconds) elapses (S21).

In this case, like the indoor unit 200 according to Embodiment 2, the movement of the user U1 is tracked, the intensive blowing is continued toward the user position P1 (in this case, the user position P1 is different from the close position P0), and when a predetermined time (for example, 30 minutes) has elapsed, it is determined whether or not the user U1 moves from the user position P1 (see S11 in FIG. 11). The processes after the determination are similar to those of the indoor unit 200 according to Embodiment 2.

As described above, since the indoor unit 300 according to Embodiment 3 executes the steps (the processes), the user U1 who is the bathed person can quickly activate the refrigeration cycle when the user U1 stands at the close position P0 without an operation of the remote controller or the like. In addition, as long as the user U1 continuously stands at the close position P0, the user U1 can be cooled by the intensive blowing until the close blowing time elapses.

Then, when the close blowing time has elapsed, or when the user U1 who is the bathed person leaves the close position P0 (corresponding to a timing at which the user is expected to finish the cooling down), the intensive blowing is stopped, and the dispersive blowing is started.

Hence, the user U1 who is the bathed person can start to be cooled easily and quickly without an operation of the remote controller or the like. Also, after the cooling down, the user does not receive the intensive airflow without an operation of the remote controller or the like. The user can enjoy the comfortable air-conditioned environment.

Also, the comfortableness is maintained for the user U1 who is not the bathed person but is sensitive to heat (or cold), or the user U2 who is not the bathed person or is not sensitive to heat (or cold), like the indoor unit 200 according to Embodiment 2.

Further, if the user U1 performs the predetermined motion described in Embodiment 1, the air-conditioning condition is changed to the gesture instruction condition corresponding to the motion. The gesture instruction condition is displayed on the remote-controller display device 82, and the change to the gesture instruction condition is notified by the buzzer sound. Accordingly, since the air-conditioning condition is easily changed, the comfortableness of the air-conditioned environment can be further increased.

Embodiment 4

Figure 16:
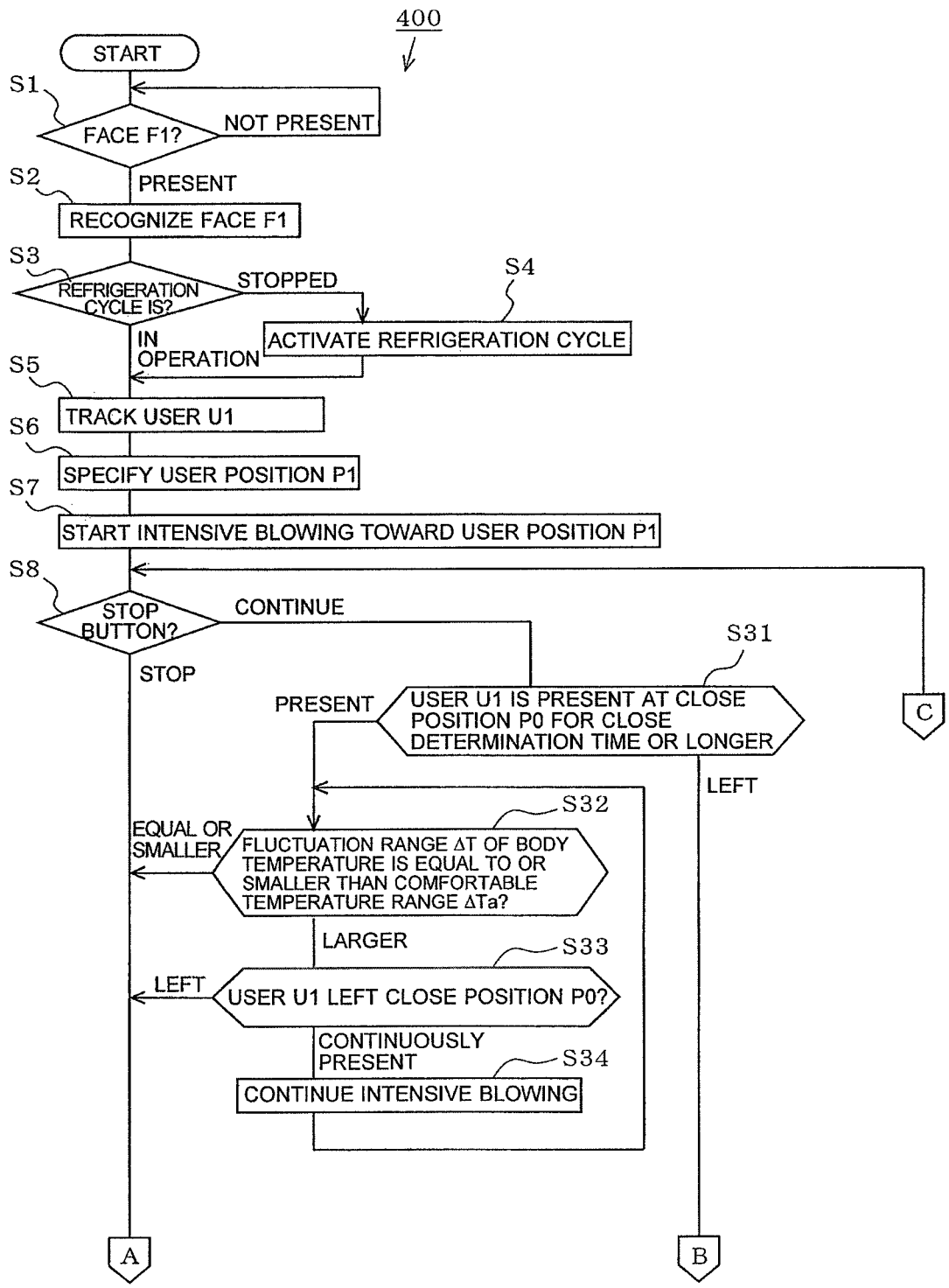
FIG. 16 is a flowchart showing control steps of the indoor unit shown in FIG. 15.

FIGS. 15 and 16 explain an indoor unit of an air-conditioning apparatus according to Embodiment 4 of the present invention. FIG. 15 is a temperature change chart schematically showing a change in temperature of swing blowing. FIG. 16 is a flowchart showing control steps. Parts the same as or corresponding to those in Embodiment 3 refer the same reference signs, and the description is partly omitted.

An indoor unit 400 of an air-conditioning apparatus (hereinafter, called "indoor unit") according to Embodiment 4 responds to a demand of a user who wants to be temporarily rapidly cooled (or heated) immediately after the user takes a bath or the user enters the room from the hot (or cold) outdoor environment (hereinafter, called "bathed person"), like the indoor unit 300 (see Embodiment 3).

With the indoor unit 300 in Embodiment 3, if the user U1 is the "bathed person," the intensive blowing is executed toward the close position P0, the intensive blowing is continued for the close blowing time (for example, 10 minutes) which is the predetermined time until the cooling down is finished (see S22 in FIG. 14), and when the close blowing time (for example, 10 minutes) has elapsed, the blowing is shifted to the dispersive blowing (see S9 and S10 in FIG. 11).

However, depending on the heating (cooling) state of the user U1, the close blowing time which is the predetermined time until the cooling (heating) is finished is not constant. The indoor unit 400 determines the timing at which the blowing is shifted to the dispersive blowing with regard to a change in body temperature of the user U1.

The indoor unit 400 includes temperature detecting means (temperature sensor, not shown) capable of detecting the surface temperature of the face of the user U1 standing at the close position P0. The controller (not shown) controls the vertical wind-direction plate 9 and the horizontal wind-direction plate 10 based on position information of the user U1 whose image is captured by the image pickup device 50 and body temperature information of the person detected by the temperature detecting means.

Also, the conditioned air is repeatedly and intermittently blown toward the user U1 who is the "bathed person" standing at the close position P0 (hereinafter, called "swing blowing").

That is, by rotating the vertical wind-direction plate 9, a cycle is repeated such that the conditioned air is blown to the face of the user U1 for a predetermined time, and then the conditioned air is not blown to the face of the user U1 for a next predetermined time (the conditioned air is blown to a position other than the face of the user U1). Alternatively, swing blowing may be similarly performed by rotating the horizontal wind-direction plate 10 instead of the vertical wind-direction plate 9.

FIG. 15 schematically shows a change in temperature of the face of the user U1 during the swing blowing. In FIG. 15, if the surface temperature of the face immediately after the user takes a bath is a temperature T0, the surface temperature of the face is decreased to a temperature T1 by first intensive blowing to the face. Then, when the intensive blowing to the face is intermitted, the heat of the surface of the face is recuperated, and the surface temperature is increased to a temperature T2. Then, by second intensive blowing to the face, the surface temperature of the face is decreased to a temperature T3. Further, when the intensive blowing to the face is intermitted, the surface temperature is increased to a temperature T4. Thereafter, by intermittently repeating the intensive blowing, the surface temperature of the face during the intensive blowing and the surface temperature of the face after the heat recuperation are gradually decreased.

At this time, the degree of the decrease in surface temperature of the face after the heat recuperation by repeating the swing blowing (a difference between the temperature T2 and the temperature T4 etc.) is larger than the degree of the decrease in surface temperature of the face during the intensive blowing by repeating the swing blowing (a difference between the temperature T1 and the temperature T3 etc.).

Hence, the differences are gradually decreased in order from a decrease amount $\Delta T01$ of the surface temperature of the face by the first intensive blowing (the difference between the temperature T0 and the temperature T1), an increase amount $\Delta T12$ of the surface temperature of the face by the first heat recuperation (the difference between the temperature T2 and the temperature T1), a decrease amount $\Delta T23$ of the surface temperature of the face by the second intensive blowing (the difference between the temperature T3 and the temperature T2), and an increase amount $\Delta T34$ of the surface temperature of the face by the second heat recuperation (the difference between the temperature T4 and the temperature T3).

Then, if the decrease amount of the surface temperature of the face by the intensive blowing or the increase amount of the surface temperature of the face by the heat recuperation (hereinafter, called "body-temperature fluctuation range $\Delta T$") is equal to or smaller than a comfortable temperature range $\Delta Ta$ (for example, 1° C.) which is a predetermined temperature, it may be conceived that the user U1 feels refreshed (cooled or heated).

In FIG. 16, when the indoor unit 400 starts the intensive blowing toward the user position P1 of the user standing at the close position P0 (see S7 in FIG. 10), and when the intensive blowing is continued (see S8 in FIG. 10), it is determined whether or not the user U1 is continuously present (continuously stands) at the close position P0 even if a close determination time (for example, 30 seconds) which is a predetermined time has elapsed (S31).

Then, if the user U1 is continuously present (continuously stands) at the close position P0 even when the close determination time has elapsed, it is determined that the user U1 is the "bathed person," and the swing blowing is started (S32). The swing blowing is continued until the user U1 feels refreshed (cooled or heated), that is, until the body-temperature fluctuation range $\Delta T$ is equivalent to or smaller than the predetermined comfortable temperature range $\Delta Ta$ ($\Delta T > \Delta Ta$) (S34). When the body-temperature fluctuation range $\Delta T$ is equal to or smaller than the comfortable temperature range $\Delta Ta$ which is the predetermined value ($\Delta T \leq \Delta Ta$), the blowing is shifted to the dispersive blowing (see S9 and S10 in FIG. 6).

Also, if the user U1 leaves the close position P0 before the body-temperature fluctuation range $\Delta T$ becomes equal to or smaller than the comfortable temperature range $\Delta Ta$ which is the predetermined value ($\Delta T > \Delta Ta$) (S33), the blowing is shifted to the dispersive blowing at the timing of the leaving (see S9 and S10 in FIG. 11).

In contrast, if the user U1 is not the "bathed person," after the face is recognized at the close position P0, the person leaves the close position P0 before the close determination time (for example, 30 seconds) elapses (S31).

In this case, like the indoor unit 100 according to Embodiment 1, the movement of the user U1 is tracked, the intensive blowing is continued toward the user position P1 (in this case, the user position P1 is different from the close position P0), and when a predetermined time (for example, 30 minutes) has elapsed, it is determined again whether or not the user U1 moves from the user position P1 (see S11 in FIG. 11). The steps after the determination are similar to those of the indoor units 100 and 200 according to Embodiments 1 and 2.

As described above, since the indoor unit 400 according to Embodiment 4 executes the steps (processes), the user U1 who is the bathed person can quickly activate the refrigeration cycle when the user U1 stands at the close position P0 without an operation of the remote controller or the like. In addition, the user U1 can be rapidly cooled (heated) by the intensive blowing until the user U1 feels refreshed (cooled or heated). Further, after the user U1 feels refreshed, the user U1 can be gently cooled (heated) by the dispersive blowing without an operation of the remote controller or the like.

Hence, the user U1 who is the bathed person can start to be cooled easily and quickly without an operation of the remote controller or the like. Also, after the cooling down, the user does not receive the intensive airflow without an operation of the remote controller or the like. The user can enjoy the comfortable air-conditioned environment.

Also, the comfortableness is maintained for the user U1 who is not the bathed person but is sensitive to heat (or cold), or the user U2 who is not the bathed person or is not sensitive to heat (or cold), like the indoor unit 200 according to Embodiment 2.

Further, if the user U1 performs the predetermined motion described in Embodiment 1, the air-conditioning condition is changed to the gesture instruction condition corresponding to the motion. The gesture instruction condition is displayed on the remote-controller display device 82, and the change to the gesture instruction condition is notified by the buzzer sound. Accordingly, since the air-conditioning condition is easily changed, the comfortableness of the air-conditioned environment can be further increased.

Lastly, supplementary explanation is given for the body-temperature fluctuation range $\Delta T$.

The body-temperature fluctuation range $\Delta T$ may be a decrease amount of the surface temperature of the face by certain repetitive intensive blowing (for the example of the first intensive blowing, $\Delta T=\Delta T01=T0-T1$), an increase amount of the surface temperature of the face by heat recuperation (for the example of the first heat recuperation, $\Delta T=\Delta T12=T2-T1$), or an average value of both ($\Delta T=(\Delta T01+\Delta T12)/2$).

Alternatively, the body-temperature fluctuation range $\Delta T$ may be an average value between a decrease amount of the surface temperature of the face by a plurality of times of the intensive blowing and an increase amount of the surface temperature of the face by a plurality of times of the heat recuperation (for the example of the first and second times, $\Delta T=(\Delta T01+\Delta T12+\Delta T23+\Delta T34)/4$). By using the average value of the decrease amount and the increase amount for the plurality of times, determination can be made while an influence of a variation in actual surface temperature or temperature detection is restricted.

INDUSTRIAL APPLICABILITY

In the above description, the indoor unit of the air-conditioning apparatus according to the present invention is installed in a room of a house. However, the present invention is not limited thereto. For example, the present invention may be widely used as an indoor unit of an air-conditioning apparatus mounted on a vehicle or the like.

REFERENCE SIGNS LIST

1: main body 2: front panel 3: air inlet 4: heat exchanger
4a: heat-exchanger front portion 4b: heat-exchanger upper front portion
4c: heat-exchanger upper rear portion 5: fan 6: air path 7: air outlet 8: drain pan 8a: upper surface 8b: lower surface 9: vertical wind-direction plate 9a: front vertical wind-direction plate 9b: rear vertical wind-direction plate 10: horizontal wind-direction plate 10L: left horizontal wind-direction plate group 10R: right horizontal wind-direction plate group 10a to 10h: horizontal wind-direction plate 20L: left coupling rod 20R: right coupling rod 30L: left driving means 40: main-body communication device 50: image pickup device 51: field 52: face recognition range 70: controller
80: remote controller 81: input device 82: remote-controller display device 83: remote-controller sound output device 84: remote-controller sound-output stop button 85: remote-controller communication device
90: room 91: rear wall 92: ceiling 100: indoor unit (Embodiment 1)
200: indoor unit (Embodiment 2) 300: indoor unit (Embodiment 3)
400: indoor unit (Embodiment 4) F1: face A1: distance A2: distance A3: distance L1: left forearm part R1: right forearm part
P0: close position P1: user position P2: user position P3: user position
U1: user U2: user

The invention claimed is:

1. An indoor unit of an air-conditioning apparatus, comprising:
a main body installed on a wall surface in a room and including a main-body communication device, and
a wireless remote controller including a wireless-remote-controller communication device that makes communication with the main-body communication device by using a signal,
wherein the main body has an air inlet and an air outlet, the main body including a fan that sucks indoor air from the air inlet and forms an air path to the air outlet, a heat exchanger that is arranged in the air path and executes part of a refrigeration cycle, an image pickup device that captures an image of the inside of the room, and a controller that causes the main-body communication device and the wireless-remote-controller communication device to make communication by using a signal,
wherein a wind-direction adjusting device that adjusts a blowing direction of air conditioned by the heat exchanger is arranged at the air outlet of the main body,
wherein the controller associates a motion of a person whose image is captured by the image pickup device with one of previously registered air-conditioning conditions, based on a remote-controller instruction condition which is an air-conditioning condition corresponding to a signal sent from the wireless-remote-controller communication device or based on the motion, the controller controls at least one of the fan and the refrigeration cycle based on a gesture instruction condition which is the associated air-conditioning condition, and the controller causes the main-body communication device to send a signal corresponding to the gesture instruction condition, wherein the wireless remote controller includes a wireless-remote-controller display device, and when the wireless-remote-controller communication device receives the signal corresponding to the gesture instruction condition, the wireless-remote-controller display device displays the gesture instruction condition, and wherein the controller is configured to recognize a face of a person, if the face of the person is present within a face recognition range in a field of the image pickup device for a face recognition time which is a first predetermined time, if the face of the person is recognized, activate the refrigeration cycle and control the wind-direction adjusting device so that the conditioned air is blown toward the person whose face is recognized or toward a close position at which the person is present when the face is recognized, without operation of the wireless remote controller, and stop the refrigeration cycle in any of cases including a case in which the person whose face is recognized moves to the outside of the close position after the conditioned air is blown and before a close determination time which is a second predetermined time elapses, a case when a close blowing time which is a third predetermined time has elapsed after the conditioned air is blown, and a case in which the person whose face is recognized moves to the outside of the close position before the close blowing time elapses, without operation of the wireless remote controller, wherein the close determination time is a non-zero time.

2. The indoor unit of the air-conditioning apparatus of claim 1, wherein the wireless remote controller includes a remote-controller sound output device that outputs voice, and when the wireless-remote-controller communication device receives the signal corresponding to the gesture instruction condition, the remote-controller sound output device outputs voice.

3. The indoor unit of the air-conditioning apparatus of claim 1, wherein, if the controller determines that the person moves to the outside of the room when the controller controls the wind-direction adjusting device, the controller continues the control for the wind-direction adjusting device after the determination until a fourth predetermined time elapses, and when the fourth predetermined time has elapsed, the controller stops the control for the wind-direction adjusting device.

4. The indoor unit of the air-conditioning apparatus of claim 1, wherein, when the controller recognizes the face of the person while the refrigeration cycle is stopped, the controller activates the refrigeration cycle.

5. The indoor unit of the air-conditioning apparatus of claim 1, wherein, while the wind-direction adjusting device is controlled, the wireless remote controller outputs a signal for stopping the control.

6. An indoor unit of an air-conditioning apparatus, comprising:

a main body installed on a wall surface in a room and including a main-body communication device, a wireless remote controller including a wireless-remote-controller communication device that makes communication with the main-body communication device by using a signal, and temperature sensor for detecting a body temperature of a person, wherein the main body has an air inlet and an air outlet, the main body including a fan that sucks indoor air from the air inlet and forms an air path to the air outlet, a heat exchanger that is arranged in the air path and executes part of a refrigeration cycle, an image pickup device that captures an image of the inside of the room, and a controller that causes the main-body communication device and the wireless-remote-controller communication device to make communication by using a signal, wherein a wind-direction adjusting device that adjusts a blowing direction of air conditioned by the heat exchanger is arranged at the air outlet of the main body, wherein the controller associates a motion of a person whose image is captured by the image pickup device with one of previously registered air-conditioning conditions, based on a remote-controller instruction condition which is an air-conditioning condition corresponding to a signal sent from the wireless-remote-controller communication device or based on the motion, the controller controls at least one of the fan and the refrigeration cycle based on a gesture instruction condition which is the associated air-conditioning condition, and the controller causes the main-body communication device to send a signal corresponding to the gesture instruction condition, wherein the wireless remote controller includes a wireless-remote-controller display device, and when the wireless-remote-controller communication device receives the signal corresponding to the gesture instruction condition, the wireless-remote-controller display device displays the gesture instruction condition, and wherein the controller is configured to recognize a face of a person, if the face of the person is present within a face recognition range in a field of the image pickup device for a face recognition time which is a predetermined time, if the face of the person is recognized, activate the refrigeration cycle and control the wind-direction adjusting device so that the conditioned air is intermittently and repeatedly blown toward the person whose face is recognized or toward a close position at which the person is present when the face is recognized, without operation of the wireless remote controller, and stop the refrigeration cycle in any of cases including a case in which the person whose face is recognized moves to the outside of the close position after the conditioned air is blown and before a close determination time which is a predetermined time elapses, a case in which the person whose face is recognized moves to the outside of the close position after the conditioned air is blown, and a case in which a fluctuation range of the body temperature of the person detected by the temperature sensor is equal to or smaller than a comfortable temperature range which is a predetermined temperature, without operation of the wireless remote controller, wherein the close determination time is a non-zero time.

7. The indoor unit of the air-conditioning apparatus of claim 1 or 6, wherein the main body includes a notification device, and if a situation occurs in which the controller determines that the person approaches the main body but the controller cannot recognize the face of the person, the controller causes the notification device to make notification about the situation.

* * * * *